(12) United States Patent
Boyce et al.

(10) Patent No.: US 11,557,085 B2
(45) Date of Patent: Jan. 17, 2023

(54) NEURAL NETWORK PROCESSING FOR MULTI-OBJECT 3D MODELING

(71) Applicant: Intel Corporation, Santa Clara, CA (US)

(72) Inventors: Jill Boyce, Portland, OR (US); Soethiha Soe, Beaverton, OR (US); Selvakumar Panneer, Portland, OR (US); Adam Lake, Portland, OR (US); Nilesh Jain, Portland, OR (US); Deepak Vembar, Portland, OR (US); Glen J. Anderson, Beaverton, OR (US); Varghese George, Folsom, CA (US); Carl Marshall, Portland, OR (US); Scott Janus, Loomis, CA (US); Saurabh Tangri, Rocklin, CA (US); Karthik Veeramani, Hillsboro, CA (US); Prasoonkumar Surti, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/112,792

(22) Filed: Dec. 4, 2020

(65) Prior Publication Data

US 2021/0090327 A1    Mar. 25, 2021

Related U.S. Application Data

(62) Division of application No. 16/234,463, filed on Dec. 27, 2018, now Pat. No. 10,861,225.

(Continued)

(51) Int. Cl.
G06T 7/20       (2017.01)
G06T 17/00      (2006.01)
(Continued)

(52) U.S. Cl.
CPC .............. G06T 17/00 (2013.01); G06F 3/012 (2013.01); G06F 3/013 (2013.01); G06K 9/6228 (2013.01);
(Continued)

(58) Field of Classification Search
None
See application file for complete search history.

(56) References Cited

U.S. PATENT DOCUMENTS 9,237,307 B1    1/2016  Vendrow
10,558,264 B1 *  2/2020  Watson ................ H04N 13/156
(Continued)

*Primary Examiner* — Yanna Wu
(74) *Attorney, Agent, or Firm* — Jaffery Watson Mendonsa & Hamilton LLP

(57) ABSTRACT

Embodiments are directed to neural network processing for multi-object three-dimensional (3D) modeling. An embodiment of a computer-readable storage medium includes executable computer program instructions for obtaining data from multiple cameras, the data including multiple images, and generating a 3D model for 3D imaging based at least in part on the data from the cameras, wherein generating the 3D model includes one or more of performing processing with a first neural network to determine temporal direction based at least in part on motion of one or more objects identified in an image of the multiple images or performing processing with a second neural network to determine semantic content information for an image of the multiple images.

17 Claims, 11 Drawing Sheets

Related U.S. Application Data

(60) Provisional application No. 62/717,660, filed on Aug. 10, 2018.

(51) Int. Cl.
*G06N 3/04* (2006.01)
*G06N 3/08* (2006.01)
*G06F 3/01* (2006.01)
*G06K 9/62* (2022.01)
*G06V 30/262* (2022.01)

(52) U.S. Cl.
CPC ........... *G06N 3/0454* (2013.01); *G06N 3/084* (2013.01); *G06T 7/20* (2013.01); *G06V 30/274* (2022.01); *G06T 2207/10021* (2013.01); *G06T 2207/20081* (2013.01); *G06T 2207/20084* (2013.01)

(56) References Cited

U.S. PATENT DOCUMENTS

| | | | |
|---|---|---|---|
| 2017/0115488 A1* | 4/2017 | Ambrus | G06T 19/006 |
| 2017/0148222 A1* | 5/2017 | Holzer | H04N 13/279 |
| 2019/0244366 A1 | 8/2019 | Yu | |

\* cited by examiner

NEURAL NETWORK PROCESSING FOR MULTI-OBJECT 3D MODELING

RELATED APPLICATIONS

This Application is a divisional of and claims the benefit of and priority to U.S. application Ser. No. 16/234,463, entitled NEURAL NETWORK PROCESSING FOR MULTI-OBJECT 3D MODELING, by Jill Boyce, et al., filed Dec. 27, 2018, now allowed, which claims the benefit of and priority to U.S. Provisional Application No. 62/717,660, entitled NEURAL NETWORK PROCESSING FOR MULTI-OBJECT 3D MODELING, by Jill Boyce, et al., filed Aug. 10, 2018, the entire contents of which are incorporated herein by reference.

TECHNICAL FIELD

Embodiments described herein relate to the field of computing systems and, more particularly, neural network processing for multi-object three-dimensional (3D) modeling.

BACKGROUND

In the modeling of three-dimensional (3D) objects, there may be multiple cameras to capture a scene as a 3D model is formed. Each camera may operate to capture images from a different viewpoint, thus generating multiple inputs for the generation of a full 3D image of the scene.

However, in a conventional system the multiple inputs for generating a 3D model can create certain problems because the cameras and inputs are not intelligently based on motion or other related factors.

Because of the lack of intelligent data regarding motion or other related factors for image generation, 3D modeling in a conventional system will commonly include inaccuracies. As a result of the inaccuracies, the user experience in utilizing a system is reduced by a reduction in image fidelity, resolution, or other image characteristics.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are directed to neural network processing for multi-object three-dimensional (3D) modeling.

In some embodiments, an apparatus, system or process provides for neural network processing in 3D modeling, including one or more of:

(a) Multi-object 3D modeling including neural network determination of object temporal direction;

(b) 3D Model generation based on semantic contents of imaging; and (c) Predictive operation of neural network enhanced head-mounted display (HMD).

Figure 1:
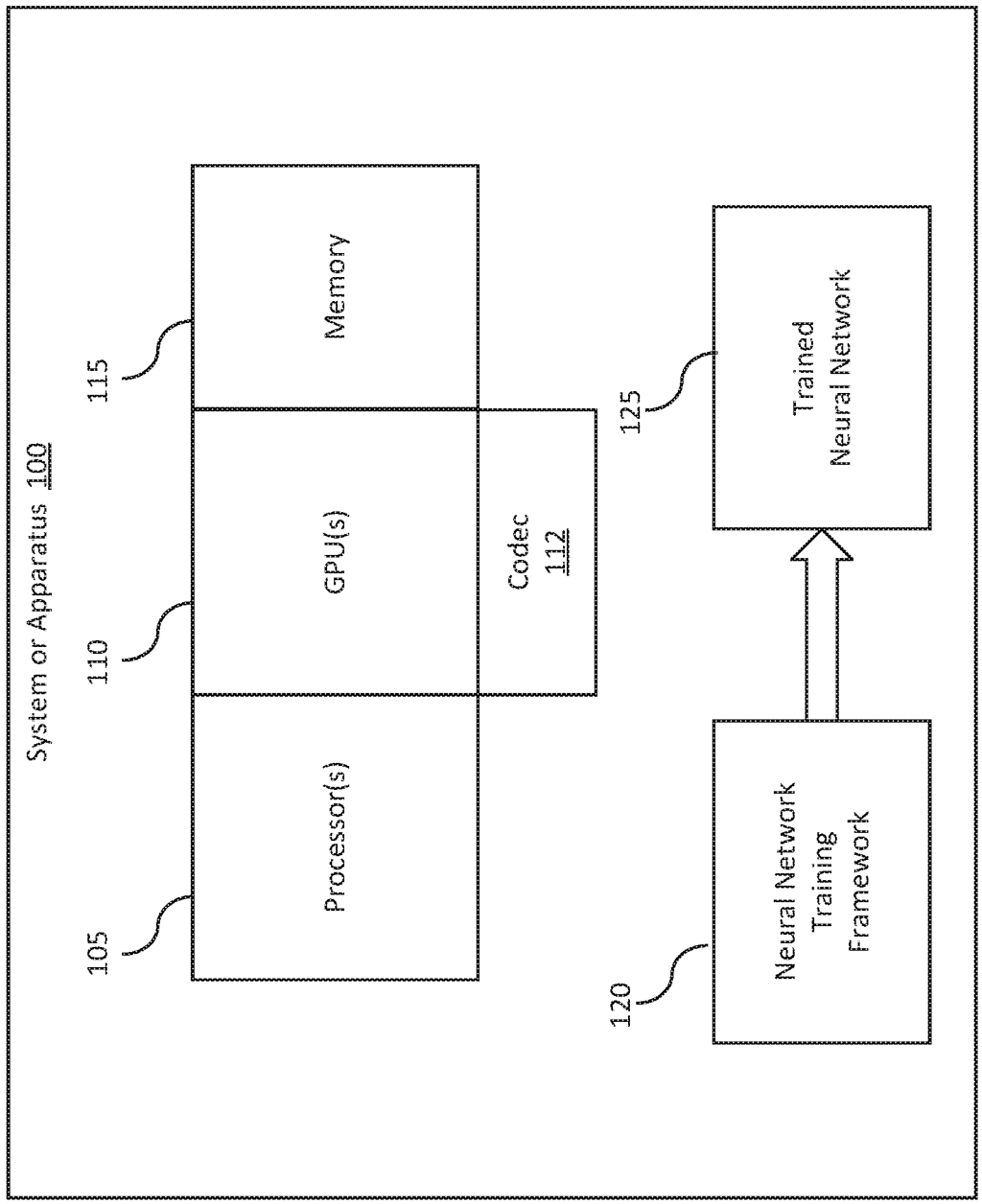
FIG. 1 is an illustration of a system or apparatus to train a neural network according to some embodiments.

FIG. 1 is an illustration of a system or apparatus to train a neural network according to some embodiments. In some embodiments, the system or apparatus is to support multi-object three-dimensional modeling utilizing neural network processing.

Figure 6:
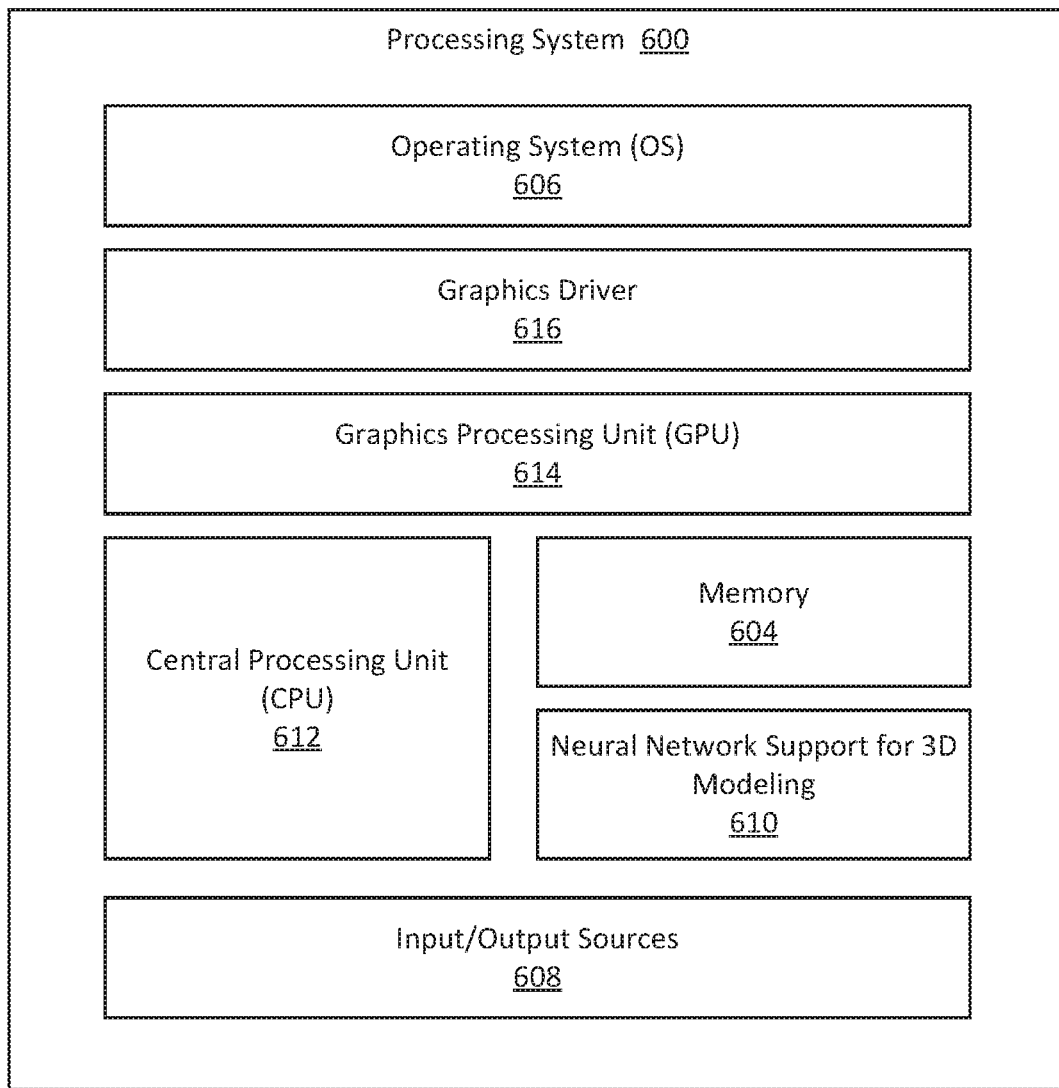
FIG. 6 illustrates a processing system to provide neural network processing for 3D modeling according to some embodiments.
Figure 7:
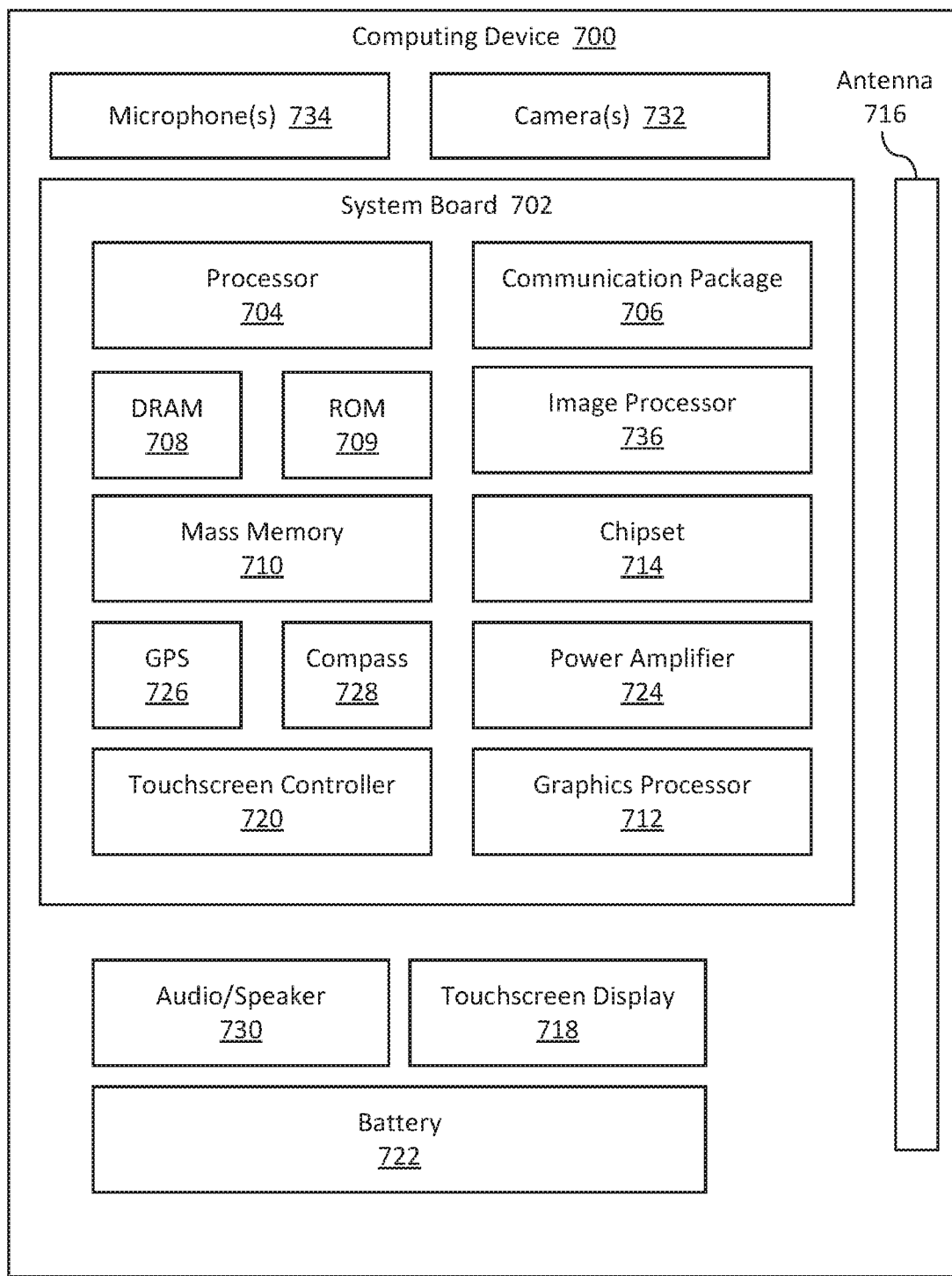
FIG. 7 illustrates a computing device to provide neural processing for 3D modeling according to some embodiments.

In some embodiments, a system or apparatus 100 for video processing may include, for example, a processing system such as the processing system 600 illustrated in FIG. 6 or a computing device such as the computing device 700 illustrated in FIG. 7. In some embodiments, the system or apparatus 100 includes one or more processor cores. In some embodiments, the system or apparatus 100 includes one or more processors 105 (which may include one or more CPUs (Central Processing Units)) having the one or more processor cores, and may further include one or more GPUs (Graphics Processing Units) 110 having one or more graphics processor cores, wherein the GPUs 110 may be included within or separate from the one or more processors 105. However, embodiments are not limited to this particular processing structure. In some embodiments, the server system further includes a memory 115 to store data, including video data.

In some embodiments, the system or apparatus 100 includes a video encoder/decoder such as video codec engine 112. The video codec engine 120 may, for example, be included within the one or more GPUs 110. In some embodiments, the system or apparatus 100 includes a neural network training framework 120 to train a neural network 125.

In some embodiments, the system or apparatus 100 provides processing as illustrated in one or more of FIGS. 2-5B to provide improved multi-object, three-dimensional modeling in one or more of multi-object 3D modeling including neural network determination of object temporal direction; 3D Model generation based on semantic contents of imaging; improvement of 3D modeling based on imaging characteristics; or predictive operation of neural network enhanced head-mounted display (HMD).

Figure 2:
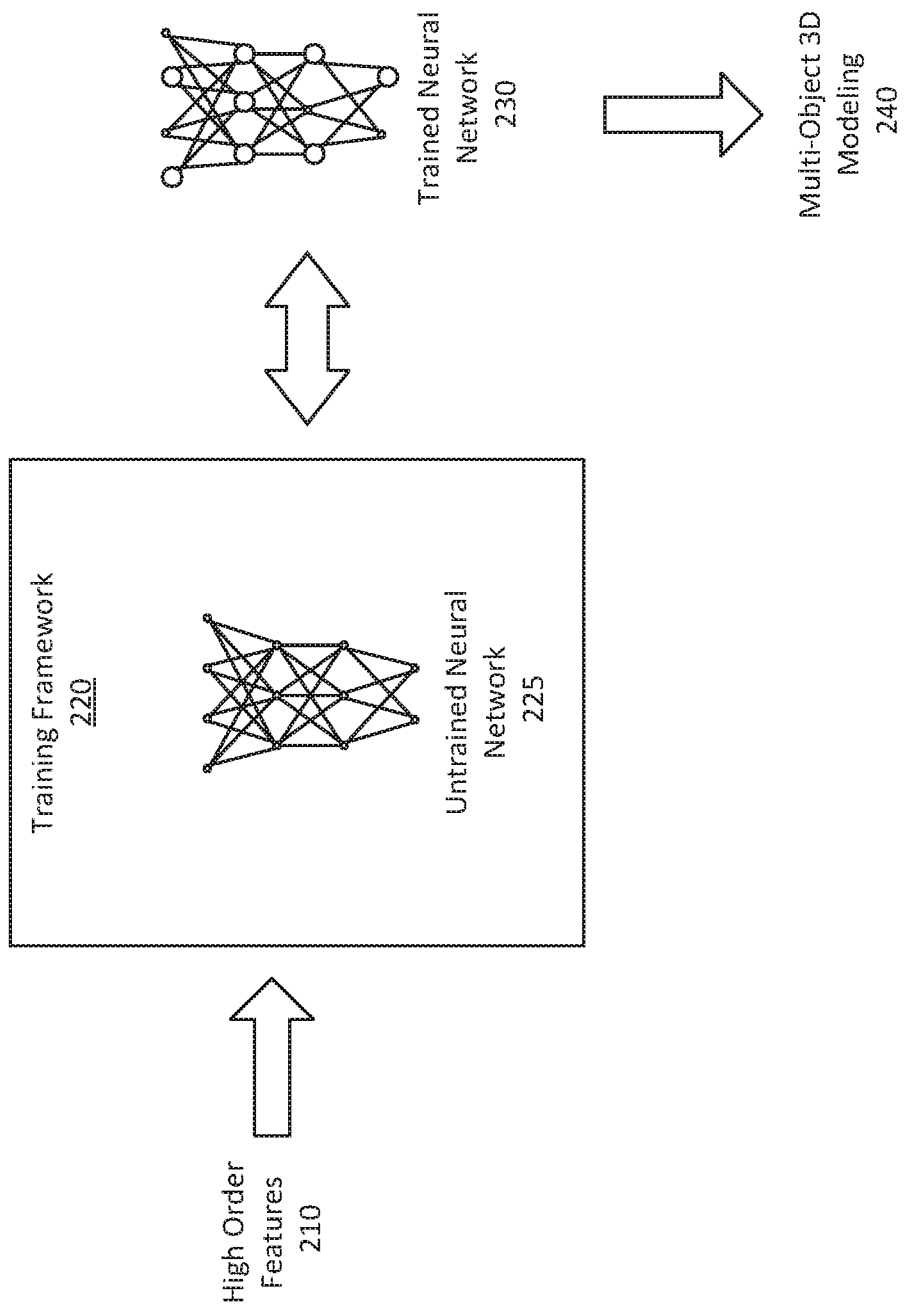
FIG. 2 is an illustration of training of a neural network to provide improved multi-object three-dimensional modeling according to some embodiments.

FIG. 2 is an illustration of training of a neural network to provide improved multi-object three-dimensional modeling according to some embodiments. As illustrated in FIG. 2, a training framework 220 provides for training of an untrained neural network 225 to generate a trained neural network 230 for use in machine learning and deep learning operations. Additional details regarding machine learning and deep learning and the operation of a neural network may be as provided in FIGS. 6-9B. In some embodiments, the neural network training is to support multi-object 3D modeling 240, with the training including high order feature data 210.

(a) Multi-Object 3D Modeling Including Neural Network Determination of Object Temporal Direction In some embodiments, an apparatus, system, or process is to utilize neural network processing to analyze motion within a three-dimensional (3D) video to identify a background as being static and separately identify multiple objects, with the individual objects being identified based on texture, depth, and motion of each identified object. In some embodiments, the apparatus, system, or process including the use of neural network analysis to provide a 3D temporal direction for each of multiple objects in an image.

In some embodiments, the neural network training is applied to improve a 3D model by calculating high order features (such as splines from curve fitting) on each of multiple objects in a scene individually, and on the background. In some embodiments, static and dynamic objects are to be treated differently in 3D image processing. For dynamic objects, a temporal direction describing the object 3D motion at a point in time is added to the model for the object, wherein the temporal direction may be utilized to improve image modeling. Improving the 3D model may include improving splines through curve fitting, filling holes in 3D models using learning information, and other model improvements. In some embodiments, the processing of multiple cameras separately may be used to generate 3D models from 2D images.

In some embodiments, an apparatus, system, or process includes sending alternate representations of the foreground of a 3D image, wherein the alternate representations of the foreground are based at least in part on temporal direction information.

Figure 3A:
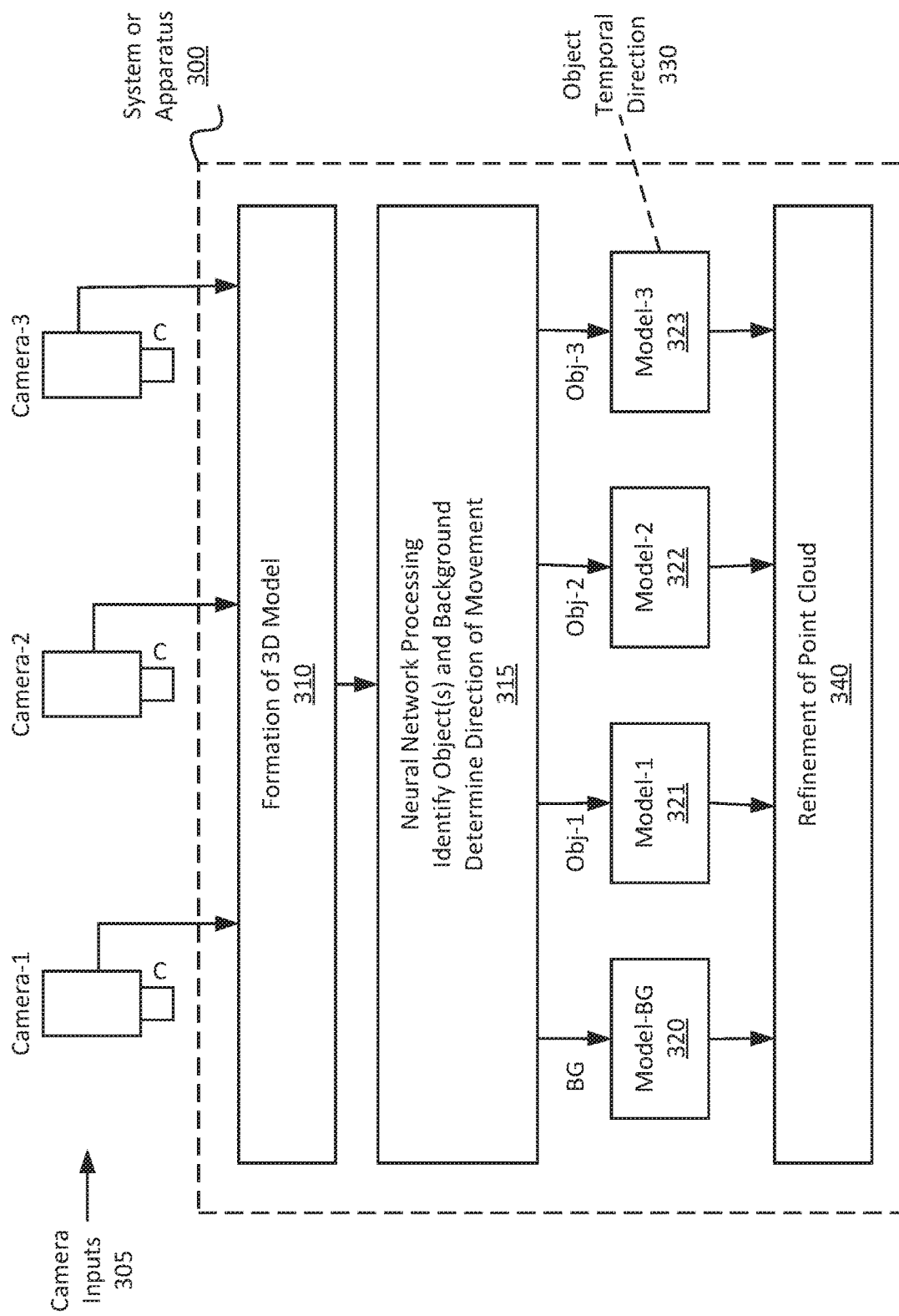
FIG. 3A is an illustration of an apparatus or system to provide multiple object modeling with temporal direction according to some embodiments.

FIG. 3A is an illustration of an apparatus or system to provide multiple object modeling with temporal direction according to some embodiments. In some embodiments, in an apparatus or system 300 captured image data from multiple camera inputs 305 for 3D video, such as the illustrated Camera-1, Camera-2, and Camera-3, are utilized in 3D model formation 310. In some embodiments, the apparatus or system 300 is to utilize neural network processing to identify and separate each object and the background in a frame of the captured image data, and further to determine a direction of movement for each identified object 315, and thus distinguish between static models and dynamic models on a frame by frame basis.

As illustrated in FIG. 3A, in a particular example data for the background (BG) and one or more objects, in this case being three identified objects designated as Object 1 (Obj-1), Object 2 (Obj-2), and Object 3 (Obj-3), in 3D video are provided for the generation of models for the background, Model-BG 320, and for each of the identified objects, Model-1 321, Model-2 322, and Model-3 323.

In some embodiments, a trained neural network is utilized to assist with image segmenting and 3D modeling. The neural network provides the ability to distinguish between static models and dynamic models on a frame by frame basis, and thus greatly improving the capabilities of the system to correctly identify which elements in a frame are static and which are moving in particular directions in 3D space.

In contrast with conventional processing, the neural network 315 allows for learning to rapidly and accurately determine motion of objects at any time. In some embodiments, neural network processing of 3D video data includes determination of temporal direction of objects (the direction the object is moving at a particular time), with the object temporal direction 330 being included in the resulting object models 321-323. (As used herein, a model of an object that includes a temporal direction for the object may be referred to as a directional model.) In the 3D video data processing, the identified background is to be treated as a static element, while the identified objects may include separate object motion information in the form of a temporal direction element for each object that is moving in relation to the background.

In a particular example, in a particular frame Object-1 may be moving in a first direction in 3D space, Object-2 may be moving in second direction in 3D space, and Object-3 may, for example, be static. In this example, generated Model-BG 320 is a static model; Model-1 321 is a directional model including data indicating a first object temporal direction; Model-2 322 is a directional model including data indicating a second object temporal direction; and Model-3 323 is a static model, which may include data indicating a zero or static object temporal direction.

In some embodiments, the model data for the background and the model data for each of the identified one or more objects, including object temporal direction, are utilized in improving 3D modeling, such as, for example, refining a point cloud for a 3D image 340. The object temporal direction data improves the 3D modeling by including the temporal direction data within the point cloud representation of a 3D scene, and thus allowing for 3D modeling that recognizes the relative direction of motion of each of one or more objects.

Figure 3B:
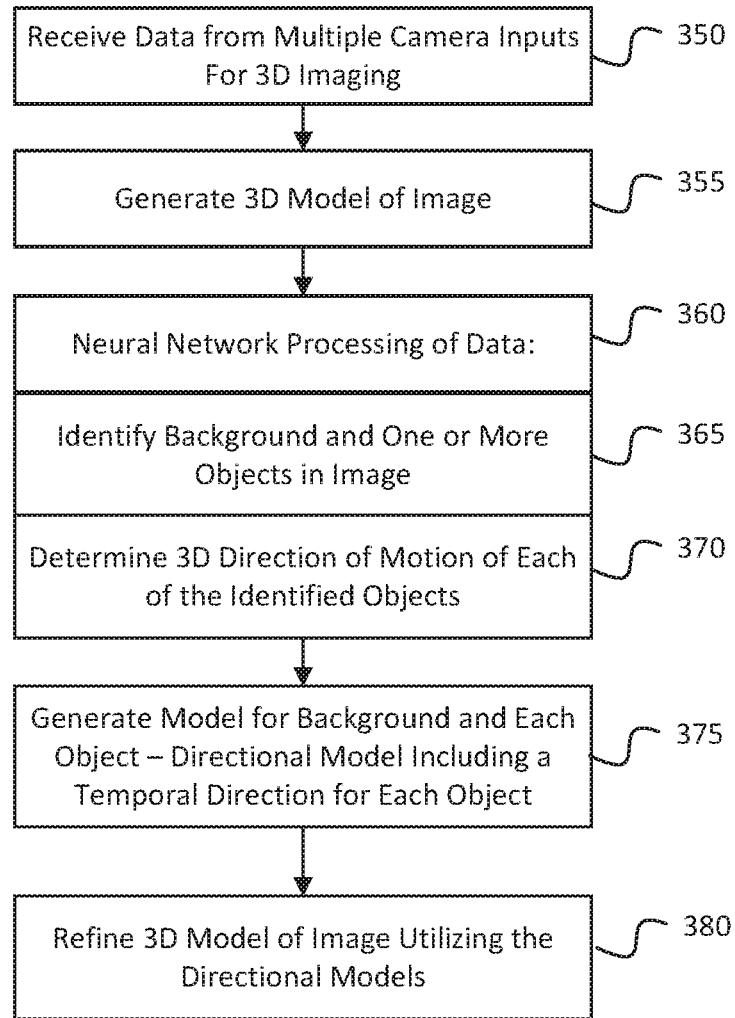
FIG. 3B is an illustration of a process for to provide background and multiple object modeling utilizing neural network processing according to some embodiments.

FIG. 3B is an illustration of a process for to provide background and multiple object modeling utilizing neural network processing according to some embodiments. In the illustrated process, data is received from multiple camera inputs for 3D imaging 350, and a 3D model of the image is generated 355.

In some embodiments, neural network processing of data is performed 360, wherein the process includes identifying the background and one or more object in the image 365 and determining a 3D direction of motion of each of the identified one or more objects 370.

In some embodiments, further in the process a model is generated for the background and each of the multiple identified one or more objects, wherein the model for each of the one or more models that is in motion includes a temporal direction 375. The 3D model of the image then may be refined, with the refinement of the 3D model being based at least in part on the directional models of the one or more objects 380.

(b) 3D Model Generation Based on Neural Network Analysis of Semantic Contents of Images In some embodiments, an apparatus, system, or process utilizes neural network processing to generate semantic content information regarding an image, wherein the semantic content image is used in the generation of the 3D image. The semantic content information may describe what is present and/or occurring in the image, such as identification of a type of object and/or activity (a person kicking a ball, an animal running, a sailboat sailing, etc.) In some embodiments, rather than using camera images directly for 3D model generation, an apparatus, system, or process instead utilizes neural network processing to identify the semantic content, and the semantic content information is then utilized in the generation of the 3D image.

In some embodiments, the semantic content information may be used may be used to identify areas of interest in the image, correlate capture cameras that contribute the most salient information for the image, and to prioritize the cameras in the generation of the 3D model. In this manner, the fine or more salient features provided by certain cameras are captured, which could otherwise be lost in the 3D model during the generation of such model. In some embodiments, an apparatus, system, or process is to analyze separately each of multiple cameras being utilized for 3D modeling to determine features based on the neural network determined areas of interest in an image. For example, the areas of interest information may indicate that one or more regions of an image are of particular interest because of a particular object and/or activity. In some embodiments, the camera data is analyzed with regard to the semantic content information to determine one or more cameras and/or one or more portions of the viewpoints of the one or more cameras for emphasis in the generation of a 3D image. In some embodiments, the 3D model is refined based on the analysis of the individual camera, which may include the features or characteristics of each camera. In some embodiments, special attention may be paid to determine where a first variable of a model is poor, e.g., has holes, and thus allows for a more complete 3D model that presented in light of the semantic content of each camera.

In some embodiments, after content models are produced, an apparatus, system, or process is to correlate the different cameras with the final selected content. In some embodiments, the input from one of more of these cameras may be weighted higher, such as if the analysis of the one or more cameras indicates that such one or more cameras provide higher quality data.

Figure 4A:
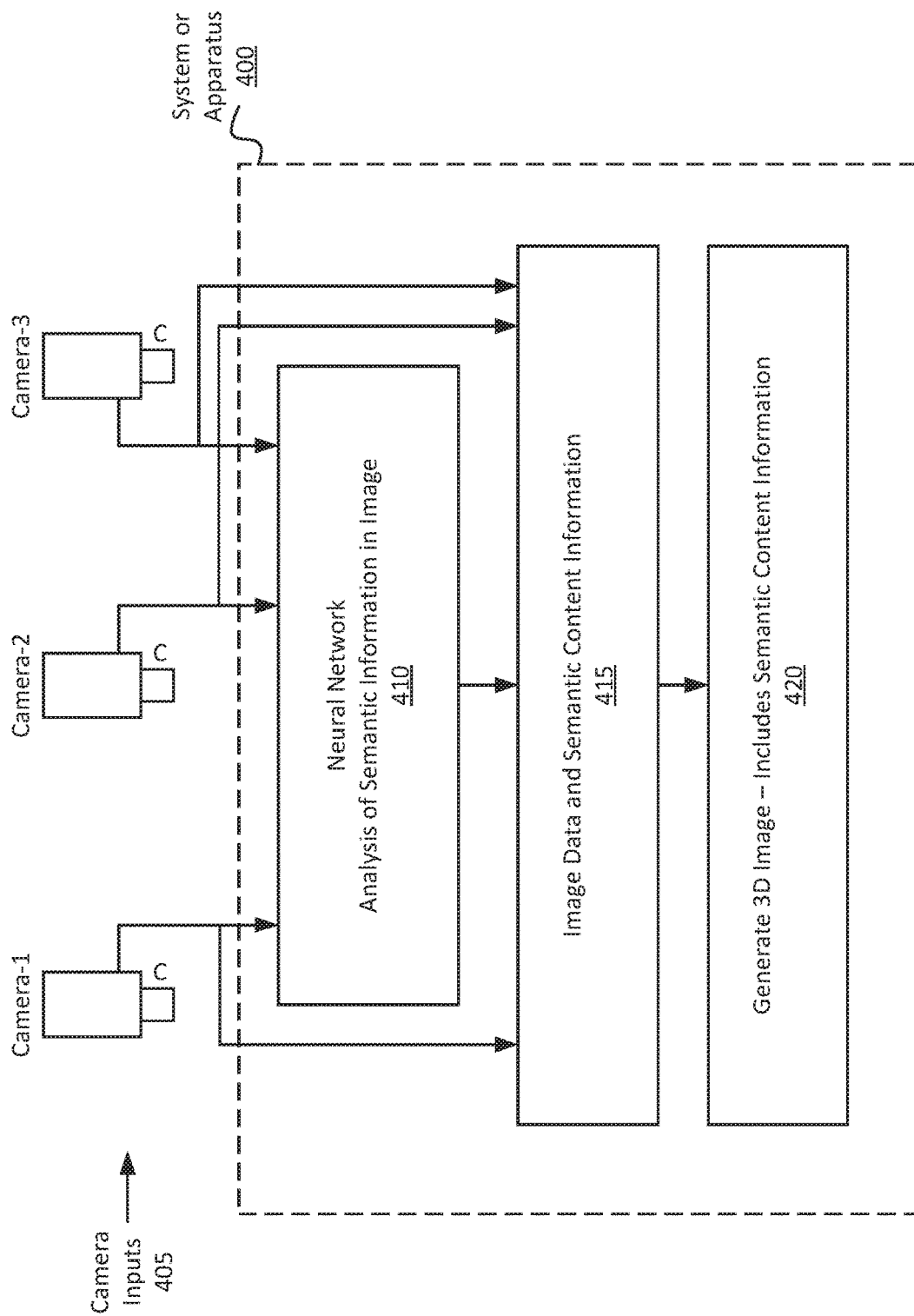
FIG. 4A is an illustration of 3D modeling based on neural network determination of semantic content information according to some embodiments.

FIG. 4A is an illustration of 3D modeling based on neural network determination of semantic content information according to some embodiments. As illustrated in FIG. 4A, a system or apparatus 400 includes multiple camera inputs for the generation of a 3D model, such as inputs for cameras 405 including Camera-1, Camera-2, and Camera-3. The cameras 405 may be separate from the system or apparatus 400, as illustrated in FIG. 4A, or may be a part of the system or apparatus 400. While the particular example illustrated in FIG. 4A includes three cameras, embodiments are not limited to any particular number of cameras.

In some embodiments, rather than generating a 3D image directly from received image data, the data is received and utilized for neural network processing to identify semantic content of an image 410, wherein the semantic content may include identification of what is present and/or occurring in the image.

In some embodiments, the image data and the semantic content information (which may be received separately or in a combined form) are utilized in the generation of a 3D image 420, wherein the 3D image is based at least in part on the neural network determined semantic content information. In this manner, an improved 3D image may be generated because the image generation includes as a basis knowledge regarding what is present and/or occurring in the image.

Figure 4B:
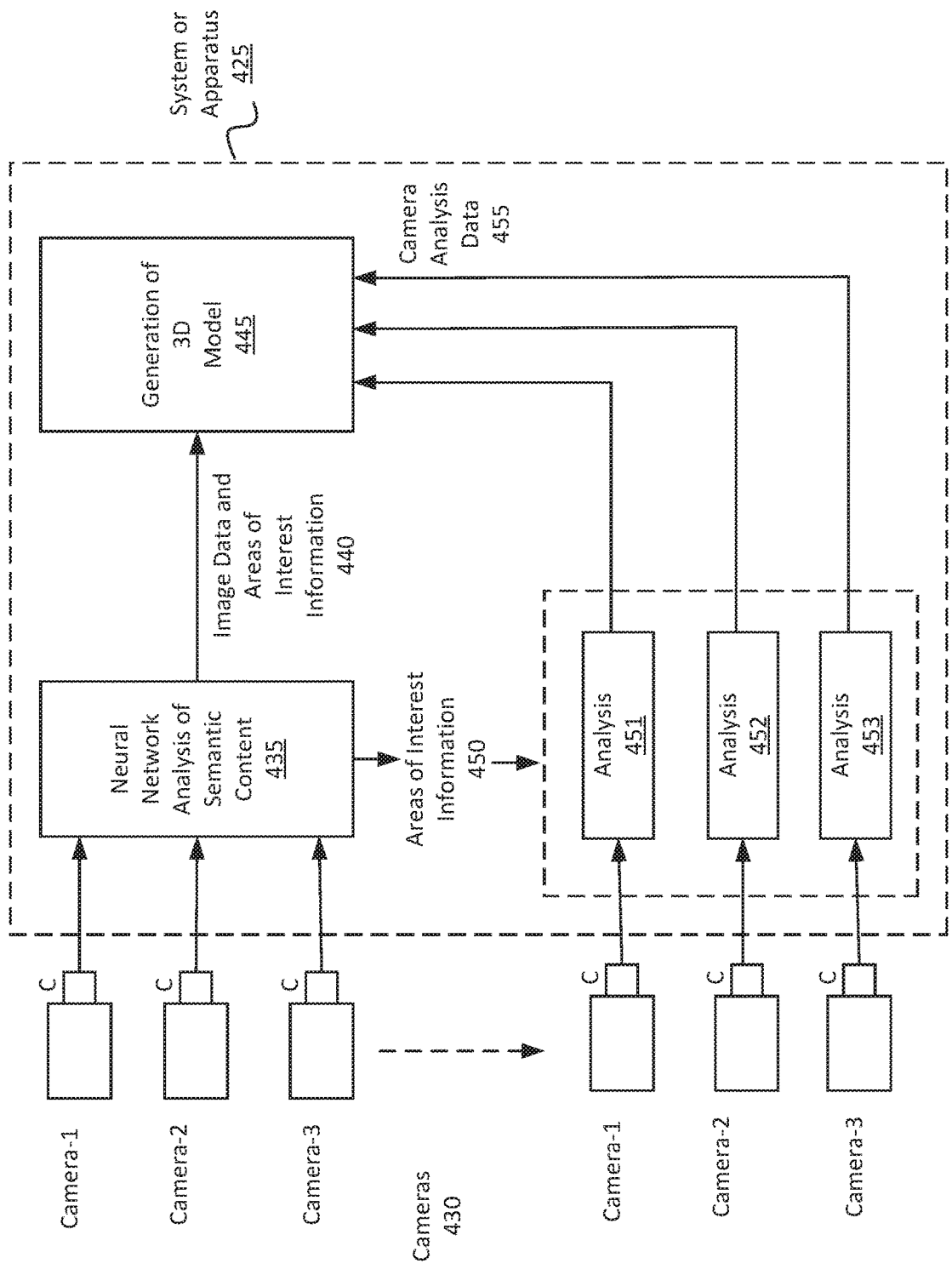
FIG. 4B is an illustration of 3D modeling based on neural network determination of semantic content information and camera analysis according to some embodiments.

FIG. 4B is an illustration of 3D modeling based on neural network determination of semantic content information and camera analysis according to some embodiments. As illustrated in FIG. 4B, in a system or apparatus 425 including inputs for multiple cameras 430, such as the Camera-1, Camera-2, and Camera-3 in the illustrated example, to generate a 3D model. The cameras 430 may be separate from the system or apparatus 425, as illustrated in FIG. 4B, or may be a part of the system or apparatus 425. While the particular example illustrated in FIG. 4B includes three cameras, embodiments are not limited to any particular number of cameras.

In some embodiments, rather than generating a 3D image directly from received image data, the data is received and utilized for neural network processing to identify areas of interest in an image based on determined semantic content of an image 430, wherein the semantic content may include identification of what is present and/or occurring in the image. In some embodiments, the image data and areas of interest information (separately or together) is received for generation of a 3D model 445, wherein the 3D model is refined or improved based at least in part on neural network determined knowledge regarding areas of interest in an image.

In some embodiments, the areas of interest information 450 is further utilized for analysis of the camera data from the cameras 430. In some embodiments, the system or apparatus is to prioritize use of the camera data based at least in part on the analysis of the camera data. The analysis may include features or characteristics of the camera data relating to the areas of interest for an image. As illustrated in FIG. 4B, each of the multiple cameras is analyzed separately to obtain information regarding the features or characteristics of the data generated by each of the cameras. In the illustrated example, Analysis 451 is generated for Camera-1, Analysis 452 is generated for Camera-2, and Analysis 453 is generated for Camera-3. In an example, the analysis 451 for Camera-1 may include information indicating that data provided by Camera-1 is especially valuable for generation of one or more areas of interest in an image because of the viewpoint of Camera-1, because of the quality of the data in the area of interest from Camera-1, or any other factor.

In some embodiments, the analysis for each camera 451-453, shown as camera analysis data 455 is provided for generation of the 3D model 445. In some embodiments, the generation of the 3D thus may be based at least in part on both the neural network determined areas of interest information 440 and the camera analysis data 455, thus providing for an improved 3D image that addresses the areas of interest in an image, and the camera data that provides the most valuable contribution to such areas of interest.

(c) Predictive Operation of Neural Network Enhanced HMD

In some embodiments, based on neural network analysis of motion data for a head-mounted display (HMD), an apparatus, system, or process is to predict a next frame for the HMD. In this manner, knowledge gained from neural network analysis regarding motion of the HMD can be utilized to improve the modeling of 3D images through the selection of a generative model that is best suited for the next viewing frame, and thus provide a perceptually correct image to a user. In contrast with conventional 3D model generation, the neural network processing enables predictive operation using motion and other data, rather than simply responding to the motion in rendering of images.

Figure 5:
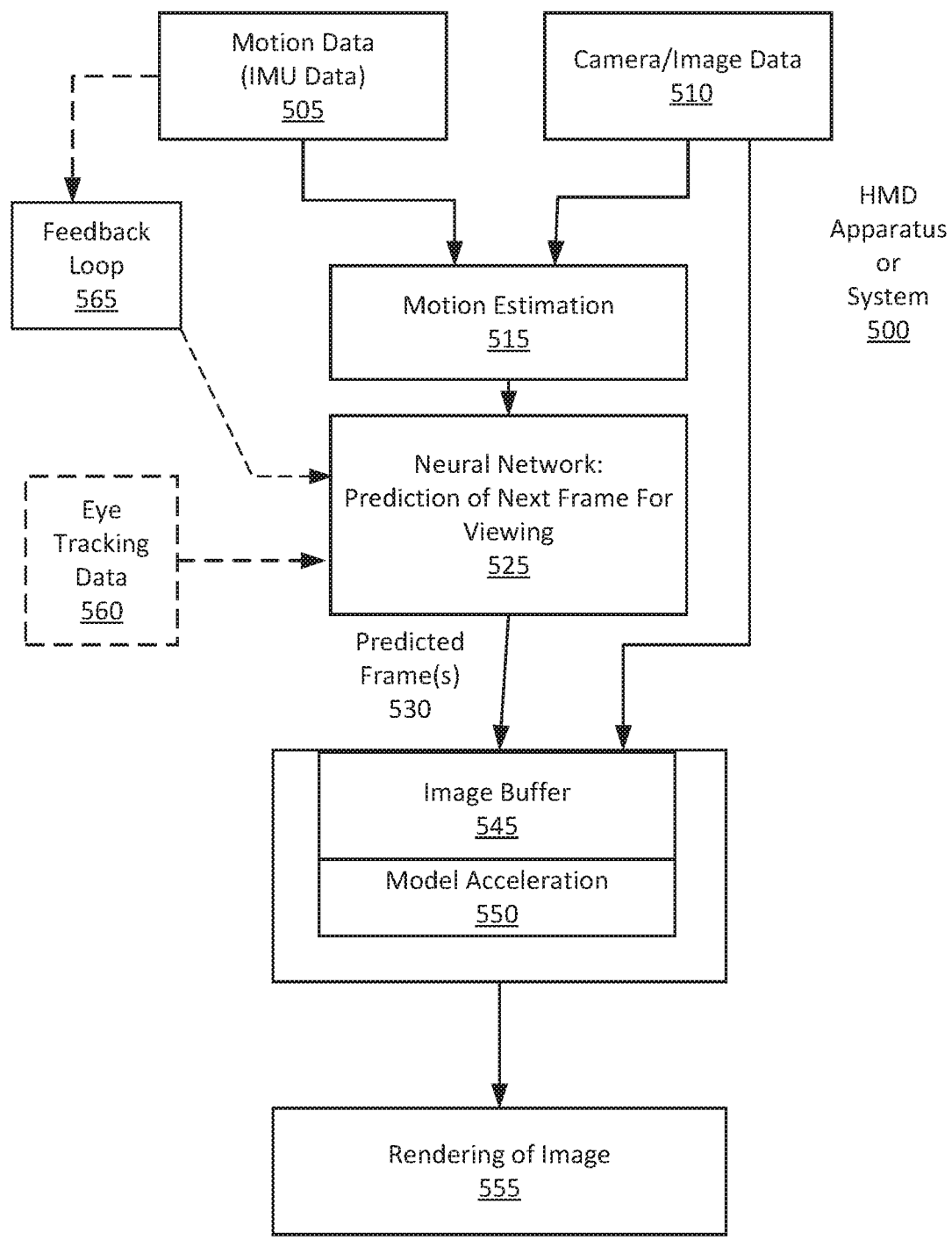
FIG. 5 is an illustration of an apparatus, system, or process for motion aware generative model selection according to some embodiments.

FIG. 5 is an illustration of an apparatus, system, or process for motion aware generative model selection according to some embodiments. As illustrated in FIG. 5, in an HMD apparatus or system 500, an apparatus, system, or process provides for motion data for the HMD, which may include but is not limited to data from an HMD inertial measurement unit (IMU) or other motion detector element for an HMD) and camera or other image data 510 to generate to provide a motion estimation 515, thus determining whether the HMD 500 is in motion, or has a certain level of motion. The HMD apparatus or system 500 may in general be referred to as a neural network enhanced HMD apparatus or system.

In some embodiments, based at least in part on the motion estimation, a neural network is applied to predict a next frame for viewing by the user 525, resulting in the generation of one or more predicted frames 530. In contrast with a conventional system, which may have general motion information, application of neural network processing enables rapid and accurate determination of where the gaze of a viewer is directed utilizing the combination of motion information and image data. Accurate determination of a next frame allows for improved quality of image rendering, and a better user experience in HMD use. The motion data affects the quality and accuracy of the neural network generated blob.

In some embodiments, the prediction of a next frame for viewing may include a feedback loop 565, the feedback loop to determine real-time accuracy of the prediction using active or passive methods and to apply such real-time accuracy to improve the future accuracy of prediction. For example, motion of the HMD to a viewpoint that differs from the predicted frame may be utilized to improve future prediction. In some embodiments, the neural network 525 may generate a range of frames that the system may select from for presentation to the user based on certain inputs, which may allow for reduction in chances of incorrect prediction, and thus further improvement in HMD image generation.

In some embodiments, the neural prediction of a next frame for viewing may further be based on other data that may be indicative of a user's intent regarding image viewing. In one example, the neural network prediction may further be based at least in part on eye tracker data, wherein an eye tracker in general is a device or system to determine the direction of gaze of a user, the motion of an eye of the user, or other related information regarding the eye or eyes of a user.

In some embodiments, based at least in part on the neural network predicted frame or frames for an HMD, the HMD apparatus or system 500 is to render the image for the user. For example, rendering may be based at least in part on image data to be stored in an image buffer 545 and acceleration for a 3D model utilizing the motion estimation 550, which then utilized in the rendering of the image for HMD display 555.

In some embodiments, an apparatus, system, or process may be extended by performing processing for only one eye of the user, and then generating an image for the second eye. For example, a neural network may be utilized to apply data for one eye (a first eye) of a user and predict a next frame for the first eye. In some embodiments, the neural network training data may then be used to infer the second eye image model. In this manner, the neural network processing may be reduced while maintaining a same or similar accuracy for the predictive frame for viewing for both eyes of the user.

In some embodiments, an apparatus, system, or process may include one or more of the following additional enhancements or alternative elements in a neural network enhanced HMD apparatus or system:

(1) Motion blur may be added to synthetic objects based on the determined HMD motion.

(2) Foveated data (data in which image resolution may vary based on one or more fixation points) is applied, with a gaze of a user being utilized to help with frame selection.

(3) Rendering may be revised from a previous frame, rather than being fully generated, if there is low motion for the HMD.

(4) An HMD is to perform the SRGAN (Super Resolution Generative Adversarial Network) plus composition or warping using a GAN (Generative Adversarial Network).

(5) With immersive projected environments, an apparatus, system, or process is to update the parts of an image where user's general gaze is directed with higher fidelity before the areas where the user does not seem to be attending to, such as based on environment-based cameras watching the user.

(6) An eagle eye mode for AR (Augmented Reality) glasses is applied, wherein the glasses are to zoom in on things that are too far away to read or otherwise discern. In some embodiments, the neural network processing may further provide for prediction of the use of the eagle mode.

System Overview

FIG. 6 illustrates a processing system to provide neural network processing for 3D modeling according to some embodiments. For example, in one embodiment, a neural network element or mechanism 610 of FIG. 6 may be employed or hosted by the processing system 600, which may include, for example, computing device 700 of FIG. 7, for purposes of supporting multi-object 3D modeling. Processing system 600 represents a communication and data processing device including or representing any number and type of smart devices, such as (without limitation) smart command devices or intelligent personal assistants, home/office automation system, home appliances (e.g., security systems, washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet based cable television set-top boxes, etc.), global positioning system (GPS)-based devices, etc.

In some embodiments, processing system 600 may include (without limitation) autonomous machines or artificially intelligent agents, such as a mechanical agents or machines, electronics agents or machines, virtual agents or machines, electro-mechanical agents or machines, etc. Examples of autonomous machines or artificially intelligent agents may include (without limitation) robots, autonomous vehicles (e.g., self-driving cars, self-flying planes, self-sailing boats or ships, etc.), autonomous equipment (self-operating construction vehicles, self-operating medical equipment, etc.), and/or the like. Further, "autonomous vehicles" are not limited to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, processing system 600 may include a cloud computing platform consisting of a plurality of server computers, where each server computer employs or hosts a multifunction perceptron mechanism. For example, automatic ISP tuning may be performed using component, system, and architectural setups described earlier in this document. For example, some of the aforementioned types of devices may be used to implement a custom learned procedure, such as using field-programmable gate arrays (FPGAs), etc.

Further, for example, processing system 600 may include a computer platform hosting an integrated circuit (IC), such as a system on a chip (SoC or SOC), integrating various hardware and/or software components of processing system 600 on a single chip.

As illustrated, in one embodiment, processing system 600 may include any number and type of hardware and/or software components, such as (without limitation) graphics processing unit 614 (GPU or graphics processor), graphics driver 616 (also referred to as GPU driver, graphics driver logic, driver logic, user-mode driver (UMD), user-mode driver framework (UMDF), or simply driver), central processing unit 612 (CPU or application processor), memory 604, network devices, drivers, or the like, as well as input/output (IO) sources 608, such as touchscreens, touch panels, touch pads, virtual or regular keyboards, virtual or regular mice, ports, connectors, etc. Processing system 600 may include operating system (OS) serving as an interface between hardware and/or physical resources of processing system 600 and a user.

It is to be appreciated that a lesser or more equipped system than the example described above may be preferred for certain implementations. Therefore, the configuration of processing system 600 may vary from implementation to implementation depending upon numerous factors, such as price constraints, performance requirements, technological improvements, or other circumstances.

Embodiments may be implemented as any or a combination of: one or more microchips or integrated circuits interconnected using a system board, hardwired logic, software stored by a memory device and executed by a microprocessor, firmware, an application specific integrated circuit (ASIC), and/or a field programmable gate array (FPGA). The terms logic, module, component, engine, and mechanism may include, by way of example, software or hardware and/or a combination thereof, such as firmware.

In one embodiment, neural network support for 3D modeling 610 may be hosted by memory 604 of processing system 600. In another embodiment, neural network support for 3D modeling 610 may be hosted by or be part of operating system 606 of processing system 600. In another embodiment, neural network support for 3D modeling 610 may be hosted or facilitated by graphics driver 616. In yet another embodiment, neural network support for 3D modeling 610 may be hosted by or part of GPU 614 or firmware of GPU 614. For example, neural network support for 3D modeling 610 may be embedded in or implemented as part of the processing hardware of GPU 614. Similarly, in yet another embodiment, neural network support for 3D modeling 610 may be hosted by or part of CPU 612. For example, neural network support for 3D modeling 610 may be embedded in or implemented as part of the processing hardware of CPU 612.

In yet another embodiment, neural network support for 3D modeling 610 may be hosted by or part of any number and type of components of processing system 600, such as a portion of neural network support for 3D modeling 610 may be hosted by or part of operating system 606, another portion may be hosted by or part of graphics processor 614, another portion may be hosted by or part of application processor 612, while one or more portions of neural network support for 3D modeling 610 may be hosted by or part of operating system 606 and/or any number and type of devices of processing system 600. It is contemplated that embodiments are not limited to certain implementation or hosting of neural network support for 3D modeling 610 and that one or more portions or components of neural network support for 3D modeling 610 may be employed or implemented as hardware, software, or any combination thereof, such as firmware.

Processing system 600 may host network interface(s) to provide access to a network, such as a LAN, a wide area network (WAN), a metropolitan area network (MAN), a personal area network (PAN), Bluetooth, a cloud network, a mobile network (e.g., 3rd Generation (3G), 4th Generation (4G), 5th Generation (5G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media (including a non-transitory machine-readable or computer-readable storage medium) having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic tape, magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

FIG. 7 illustrates a computing device to provide neural processing for 3D modeling according to some embodiments. It is contemplated that details of computing device 700 may be the same as or similar to details of processing system 600 of FIG. 6 and thus for brevity, certain of the details discussed with reference to processing system 600 of FIG. 6 are not discussed or repeated hereafter. Computing device 700 houses a system board 702 (which may also be referred to as a motherboard, main circuit board, or other terms)). The board 702 may include a number of components, including but not limited to a processor 704 and at least one communication package or chip 706. The communication package 706 is coupled to one or more antennas 716. The processor 704 is physically and electrically coupled to the board 702.

Depending on its applications, computing device 700 may include other components that may or may not be physically and electrically coupled to the board 702. These other components include, but are not limited to, volatile memory (e.g., DRAM) 708, nonvolatile memory (e.g., ROM) 709, flash memory (not shown), a graphics processor 712, a digital signal processor (not shown), a crypto processor (not shown), a chipset 714, an antenna 716, a display 718 such as a touchscreen display, a touchscreen controller 720, a battery 722, an audio codec (not shown), a video codec (not shown), a power amplifier 724, a global positioning system (GPS) device 726, a compass 728, an accelerometer (not shown), a gyroscope (not shown), a speaker or other audio element 730, one or more cameras 732, a microphone array 734, and a mass storage device (such as hard disk drive) 710, compact disk (CD) (not shown), digital versatile disk (DVD) (not shown), and so forth). These components may be connected to the system board 702, mounted to the system board, or combined with any of the other components.

The communication package 706 enables wireless and/or wired communications for the transfer of data to and from the computing device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 706 may implement any of a number of wireless or wired standards or protocols, including but not limited to Wi-Fi (IEEE 802.11 family), WiMAX (IEEE 802.16 family), IEEE 802.20, long term evolution (LTE), Ev-DO (Evolution Data Optimized), HSPA+, HSDPA+, HSUPA+, EDGE Enhanced Data rates for GSM evolution), GSM (Global System for Mobile communications), GPRS (General Package Radio Service), CDMA (Code Division Multiple Access), TDMA (Time Division Multiple Access), DECT (Digital Enhanced Cordless Telecommunications), Bluetooth, Ethernet derivatives thereof, as well as any other wireless and wired protocols that are designated as 3G, 4G, 5G, and beyond. The computing device 700 may include a plurality of communication packages 706. For instance, a first communication package 706 may be dedicated to shorter range wireless communications such as Wi-Fi and Bluetooth and a second communication package 706 may be dedicated to longer range wireless communications such as GSM, EDGE, GPRS, CDMA, WiMAX, LTE, Ev-DO, and others.

The cameras 732 including any depth sensors or proximity sensor are coupled to an optional image processor 736 to perform conversions, analysis, noise reduction, comparisons, depth or distance analysis, image understanding, and other processes as described herein. The processor 704 is coupled to the image processor to drive the process with interrupts, set parameters, and control operations of image processor and the cameras. Image processing may instead be performed in the processor 704, the graphics processor 712, the cameras 732, or in any other device.

In various implementations, the computing device 700 may be a laptop, a netbook, a notebook, an Ultrabook, a smartphone, a tablet, an ultra-mobile PC, a mobile phone, a desktop computer, a server, a set-top box, an entertainment control unit, a digital camera, a portable music player, or a digital video recorder. The computing device may be fixed, portable, or wearable. In further implementations, the computing device 700 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

Machine Learning—Deep Learning

Figure 8:
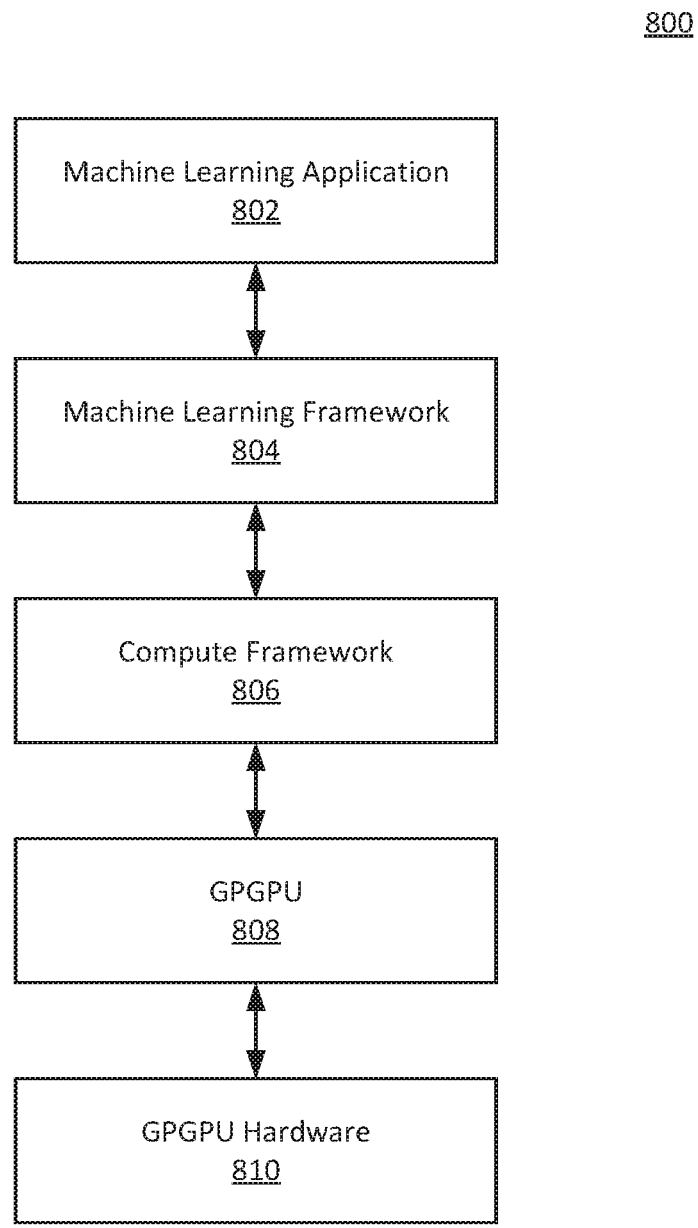
FIG. 8 illustrates a generalized machine learning software stack for 3D modeling according to some embodiments.

FIG. 8 illustrates a generalized machine learning software stack for 3D modeling according to some embodiments. FIG. 8 illustrates a software stack 800 for GPGPU (General-Purpose GPU) operation. However, a machine learning software stack is not limited to this example, and may include, for also, a machine learning software stack for CPU operation.

A machine learning application 802 can be configured to train a neural network using a training dataset or to use a trained deep neural network to implement machine intelligence. The machine learning application 802 can include training and inference functionality for a neural network and/or specialized software that can be used to train a neural network before deployment. The machine learning application 802 can implement any type of machine intelligence including but not limited to image recognition, mapping and localization, autonomous navigation, speech synthesis, medical imaging, or language translation.

Hardware acceleration for the machine learning application 802 can be enabled via a machine learning framework 804. The machine learning framework 804 can provide a library of machine learning primitives. Machine learning primitives are basic operations that are commonly performed by machine learning algorithms. Without the machine learning framework 804, developers of machine learning algorithms would be required to create and optimize the main computational logic associated with the machine learning algorithm, then re-optimize the computational logic as new parallel processors are developed. Instead, the machine learning application can be configured to perform the necessary computations using the primitives provided by the machine learning framework 804. Exemplary primitives include tensor convolutions, activation functions, and pooling, which are computational operations that are performed while training a convolutional neural network (CNN). The machine learning framework 804 can also provide primitives to implement basic linear algebra subprograms performed by many machine-learning algorithms, such as matrix and vector operations.

The machine learning framework 804 can process input data received from the machine learning application 802 and generate the appropriate input to a compute framework 806. The compute framework 806 can abstract the underlying instructions provided to the GPGPU driver 808 to enable the machine learning framework 804 to take advantage of hardware acceleration via the GPGPU hardware 810 without requiring the machine learning framework 804 to have intimate knowledge of the architecture of the GPGPU hardware 810. Additionally, the compute framework 806 can enable hardware acceleration for the machine learning framework 804 across a variety of types and generations of the GPGPU hardware 810.

Machine Learning Neural Network Implementations

The computing architecture provided by embodiments described herein can be configured to perform the types of parallel processing that is particularly suited for training and deploying neural networks for machine learning. A neural network can be generalized as a network of functions having a graph relationship. As is known in the art, there are a variety of types of neural network implementations used in machine learning. One exemplary type of neural network is the feedforward network, as previously described.

A second exemplary type of neural network is the Convolutional Neural Network (CNN). A CNN is a specialized feedforward neural network for processing data having a known, grid-like topology, such as image data. Accordingly, CNNs are commonly used for compute vision and image recognition applications, but they also may be used for other types of pattern recognition such as speech and language processing. The nodes in the CNN input layer are organized into a set of "filters" (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map. For example, the input to a convolution layer can be a multidimensional array of data that defines the various color components of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. The architecture for an RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described below present exemplary feedforward, CNN, and RNN networks, as well as describe a general process for respectively training and deploying each of those types of networks. It will be understood that these descriptions are exemplary and non-limiting as to any specific embodiment described herein and the concepts illustrated can be applied generally to deep neural networks and machine learning techniques in general.

The exemplary neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multiple pattern recognition processes that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 9A:
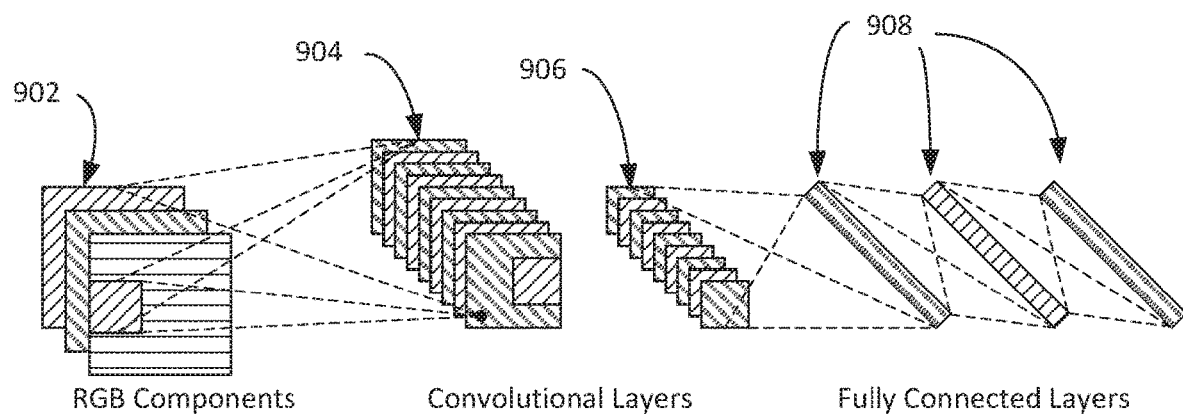
FIGS. 9A-9B illustrate an exemplary convolutional neural network for applications including 3D modeling according to some embodiments.
Figure 9B:
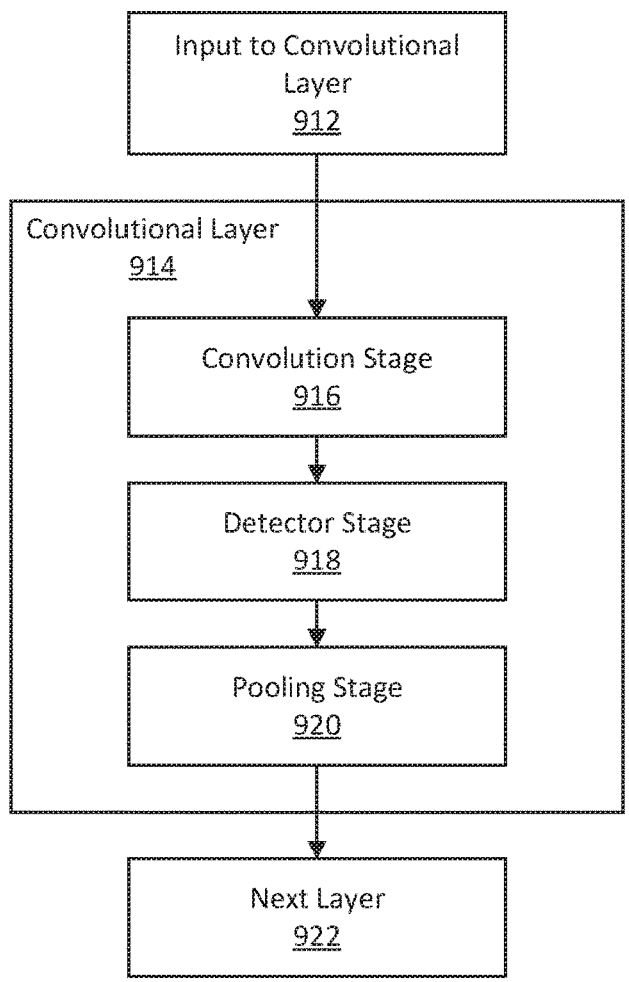

FIGS. 9A-9B illustrate an exemplary convolutional neural network for applications including 3D modeling according to some embodiments. FIG. 9A illustrates various layers within a CNN. As shown in FIG. 9A, an exemplary CNN used to model image processing can receive input 902 describing the red, green, and blue (RGB) components of an input image. The input 902 can be processed by multiple convolutional layers (e.g., first convolutional layer 904, second convolutional layer 906). The output from the multiple convolutional layers may optionally be processed by a set of fully connected layers 908. Neurons in a fully connected layer have full connections to all activations in the previous layer, as previously described for a feedforward network. The output from the fully connected layers 908 can be used to generate an output result from the network. The activations within the fully connected layers 908 can be computed using matrix multiplication instead of convolution. Not all CNN implementations are to make use of fully connected layers 908. For example, in some implementations the second convolutional layer 906 can generate output for the CNN.

The convolutional layers are sparsely connected, which differs from traditional neural network configuration found in the fully connected layers 908. Traditional neural network layers are fully connected, such that every output unit interacts with every input unit. However, the convolutional layers are sparsely connected because the output of the convolution of a field is input (instead of the respective state value of each of the nodes in the field) to the nodes of the subsequent layer, as illustrated. The kernels associated with the convolutional layers perform convolution operations, the output of which is sent to the next layer. The dimensionality reduction performed within the convolutional layers is one aspect that enables the CNN to scale to process large images.

FIG. 9B illustrates exemplary computation stages within a convolutional layer of a CNN. Input to a convolutional layer 912 of a CNN can be processed in three stages of a convolutional layer 914. The three stages can include a convolution stage 916, a detector stage 918, and a pooling stage 920. The convolution layer 914 can then output data to a successive convolutional layer. The final convolutional layer of the network can generate output feature map data or provide input to a fully connected layer, for example, to generate a classification value for the input to the CNN.

In the convolution stage 916 performs several convolutions in parallel to produce a set of linear activations. The convolution stage 916 can include an affine transformation, which is any transformation that can be specified as a linear transformation plus a translation. Affine transformations include rotations, translations, scaling, and combinations of these transformations. The convolution stage computes the output of functions (e.g., neurons) that are connected to specific regions in the input, which can be determined as the local region associated with the neuron. The neurons compute a dot product between the weights of the neurons and the region in the local input to which the neurons are connected. The output from the convolution stage 916 defines a set of linear activations that are processed by successive stages of the convolutional layer 914.

The linear activations can be processed by a detector stage 918. In the detector stage 918, each linear activation is processed by a non-linear activation function. The non-linear activation function increases the nonlinear properties of the overall network without affecting the receptive fields of the convolution layer. Several types of non-linear activation functions may be used. One particular type is the rectified linear unit (ReLU), which uses an activation function defined as $f(x)=max(0, x)$, such that the activation is thresholded at zero.

The pooling stage 920 uses a pooling function that replaces the output of the second convolutional layer 906 with a summary statistic of the nearby outputs. The pooling function can be used to introduce translation invariance into the neural network, such that small translations to the input do not change the pooled outputs. Invariance to local translation can be useful in scenarios where the presence of a feature in the input data is more important than the precise location of the feature. Various types of pooling functions can be used during the pooling stage 920, including max pooling, average pooling, and 12-norm pooling. Additionally, some CNN implementations do not include a pooling stage. Instead, such implementations substitute and additional convolution stage having an increased stride relative to previous convolution stages.

The output from the convolutional layer 914 can then be processed by the next layer 922. The next layer 922 can be an additional convolutional layer or one of the fully connected layers 908. For example, the first convolutional layer 904 of FIG. 9A can output to the second convolutional layer 906, while the second convolutional layer can output to a first layer of the fully connected layers 908.

The following clauses and/or examples pertain to further embodiments or examples. Specifics in the examples may be applied anywhere in one or more embodiments. The various features of the different embodiments or examples may be variously combined with certain features included and others excluded to suit a variety of different applications. Examples may include subject matter such as a method, means for performing acts of the method, at least one machine-readable medium, such as a non-transitory machine-readable medium, including instructions that, when performed by a machine, cause the machine to perform acts of the method, or of an apparatus or system for facilitating operations according to embodiments and examples described herein.

In some embodiments, a non-transitory computer-readable storage medium having stored thereon executable computer program instructions that, when executed by one or more processors, cause the one or more processors to perform operations including obtaining data from a plurality of cameras, the data comprising a plurality of images; and generating a 3D model for 3D imaging based at least in part on the data from the plurality of cameras, wherein generating the 3D model includes one or more of performing processing with a first neural network to determine temporal direction based at least in part on motion of one or more objects identified in an image of the plurality of images; or performing processing with a second neural network to determine semantic content information for an image of the plurality of images.

In some embodiments, performing processing with the first neural network includes identifying a background and the one or more objects in an image and determining a temporal direction for each of the one or more objects.

In some embodiments, performing processing with the first neural network further includes generating a separate model for the background and each of the one or more objects, the model of each of one or more objects including the respective temporal direction for the object.

In some embodiments, the medium further includes executable computer program instructions that, when executed by the one or more processors, cause the one or more processors to perform operations including refining a 3D image utilizing the models for the background and one or more objects.

In some embodiments, performing processing with the second neural network includes receiving image data and determining the semantic content information based at least in part on the received image data.

In some embodiments, the medium further includes executable computer program instructions that, when executed by the one or more processors, cause the one or more processors to perform operations including generating a 3D image based at least in part on the image data and the generated semantic content information.

In some embodiments, the medium further includes executable computer program instructions that, when executed by the one or more processors, cause the one or more processors to perform operations including performing processing with the second neural network to further determine one or more areas of interest in an image.

In some embodiments, the medium further includes executable computer program instructions that, when executed by the one or more processors, cause the one or more processors to perform operations including generating a 3D model based at least in part on the one or more areas of interest in an image.

In some embodiments, the medium further includes executable computer program instructions that, when executed by the one or more processors, cause the one or more processors to perform operations including analyzing camera data from a plurality of cameras utilizing the determined areas of interest, and prioritizing use of the camera data from each the plurality of cameras based at least in part on the analysis.

In some embodiments, a system includes one or more processor cores a memory to store data for three-dimensional (3D) imaging, the data comprising a plurality of images; and inputs from a plurality of cameras for 3D data capture, wherein the system is to provide one or more of 3D modeling including a first neural network to determine temporal direction based at least in part on motion of one or more objects identified in an image of the plurality of images or 3D model generation including a second neural network to determine semantic content information for an image of the plurality of images.

In some embodiments, the first neural network is to identify a background and the one or more objects in an image, and to determine a temporal direction for each of the one or more objects.

In some embodiments, the first neural network is further to generate a separate model for the background and each of the one or more objects, the model of each of one or more objects including the respective temporal direction for the object.

In some embodiments, the system is to refine a 3D image utilizing the models for the background and one or more objects.

In some embodiments, the second neural network is to receive image data and to determine the semantic content information based at least in part on the received image data.

In some embodiments, the semantic content information includes information regarding an object present in an image, an activity occurring an image, or both.

In some embodiments, the system is to generate a 3D image based at least in part on the image data and the generated semantic content information.

In some embodiments, the second neural network is further to determine one or more areas of interest in an image.

In some embodiments, the system is to generate a 3D model based at least in part on the one or more areas of interest in an image.

In some embodiments, the second neural network is further to analyze camera data from a plurality of cameras utilizing the determined areas of interest, and to prioritize use of the camera data from each the plurality of cameras based at least in part on the analysis.

In some embodiments, a head-mounted display (HMD) apparatus includes a three-dimensional (3D) display; a motion detector to generate motion data for the HMD system; and one or more inputs for camera data for the 3D display, wherein the apparatus is to generate an estimate of motion of the apparatus based at least in part on the motion data and the camera data, and wherein the apparatus is to predict a next frame for viewing utilizing a neural network analysis based at least in part on the motion estimation.

In some embodiments, the prediction of the next frame for viewing includes a feedback loop to determine real-time accuracy of the prediction and to apply the determined accuracy to improve future accuracy of prediction.

In some embodiments, the prediction of the next frame for viewing further includes generation of a range of frames.

In some embodiments, the apparatus is to select a frame from the range of frames.

In some embodiments, the prediction of the next frame for viewing further utilizes additional data indicative of a user's intent regarding image viewing.

In some embodiments, the additional data includes eye tracker data.

In some embodiments, prediction of a next frame includes processing for a first eye of the user, and inferring an image model for a second eye of the user.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer. In some embodiments, a non-transitory computer-readable storage medium has stored thereon data representing sequences of instructions that, when executed by a processor, cause the processor to perform certain operations.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. A head-mounted display (HMD) apparatus comprising:
   a three-dimensional (3D) display to display frames for a user;
   a motion detector to generate motion data for the apparatus;
   one or more inputs for camera data for the 3D display; and
   a neural network trained to perform prediction of frames for viewing by the user; and
   a feedback loop to provide data regarding determined accuracy of predicted frames to the neural network, wherein:
      the apparatus is to generate an estimate of motion of the apparatus based at least in part on the motion data and the camera data,
      the neural network is to generate one or more predicted frames as a next frame for viewing by the user utilizing neural network analysis, the neural network analysis being based at least in part on the motion estimation generated by the apparatus, and
      the apparatus is to determine the next frame for viewing by the user and display the determined next frame for viewing by the user in the 3D display, including the apparatus to:
         determine whether the one or more predicted frames include an accurate prediction of the next frame for viewing, and
         upon determining that the one or more predicted frames include an accurate prediction of the next frame for viewing, select a next frame that is accurately predicted from the one or more predicted frames for display; and
      wherein the generation by the neural network of the one or more predicted frames for the next frame for viewing by the user includes the neural network to apply the data regarding determined accuracy to improve future accuracy of predictions by the neural network of next frames for viewing.

2. The apparatus of claim 1, wherein the generation by the neural network of the one or more predicted frames as the next frame for viewing by the user further includes generation of a range of frames for selection by the apparatus.

3. The apparatus of claim 2, wherein determining the next frame for viewing by the user includes the apparatus is to select the next frame for viewing from the range of frames upon determining that the range of frames include an accurate prediction of the next frame for viewing.

4. The apparatus of claim 1, wherein the generation by the neural network of the one or more predicted frames as the next frame for viewing by the user is further based on additional data indicative of the user's intent regarding image viewing.

5. The apparatus of claim 4, further comprising an eye tracker to track at least one eye of the user, and wherein the additional data indicative of the user's intent includes eye tracker data generated by the eye tracker.

6. The apparatus of claim 1, wherein generating one or more predicted frames as the next frame for viewing by the user includes the neural network to process data for a first eye of the user and generating one or more predicted frames for the first eye, the neural network to infer an image model for a second eye of the user based at least in part on the one or more predicted frames for the first eye.

7. The apparatus of claim 1, wherein, upon the apparatus generating an estimate that indicates a low level of motion for the apparatus, the generation by the neural network of one or more predicted frames as the next frame for viewing for the user further includes revising a previous frame without the one or more predicted frames being fully generated.

8. The apparatus of claim 1, wherein the apparatus further includes an inertial measurement unit (IMU), and wherein generation of the estimate of motion of the apparatus is based at least in part on data generated by the IMU.

9. A non-transitory computer-readable storage medium having stored thereon executable computer program instructions that, when executed by one or more processors, cause the one or more processors to perform operations comprising:
   generating motion data for a head-mounted display (HMD) apparatus utilizing a motion detector, the apparatus including one or more inputs for camera data for a three-dimensional (3D) display to display frames for a user, a neural network trained to perform prediction of frames for viewing by the user, and a feedback loop to provide data regarding determined accuracy of predicted frames to the neural network;
   generating an estimate of motion of the apparatus based at least in part on the motion data and the camera data;
   performing an analysis of the motion estimation utilizing the neural network;
   generating, by the neural network, one or more predicted frames as a next frame for viewing by the user based at least in part on the neural network analysis of the motion estimation; and
   determining the next frame for viewing by the user and displaying the determined next frame for viewing by the user in the 3D display, including:
      determining whether the one or more predicted frames include an accurate prediction of the next frame for viewing; and
      upon determining that the one or more predicted frames include an accurate prediction of the next frame for viewing, selecting a next frame that is accurately predicted from the one or more predicted frames for display; and
   wherein the generation by the neural network of the one or more predicted frames for the next frame for viewing includes the neural network applying the data regarding determined accuracy to improve future accuracy of predictions by the neural network of next frames for viewing.

10. The medium of claim 9, wherein generating by the neural network of the one or more predicted frames as the next frame for viewing by the user further includes generating a range of frames for selection.

11. The medium of claim 10, wherein determining the next frame for viewing by the user includes selecting the next frame for viewing from the range of frames upon determining that the range of frames include an accurate prediction of the next frame for viewing.

12. The medium of claim 9, wherein generating by the neural network the one or more predicted frames as the next frame for viewing by the user is further based on additional data indicative of the user's intent regarding image viewing.

13. The medium of claim 12, wherein the additional data indicative of the user's intent includes eye tracker data.

14. A system comprising:
one or more processors to process data;
a memory to store data for processing, including data for neural network processing;
a head-mounted display (HMD) including a three-dimensional (3D) display to display frames fora user;
a motion detector to generate motion data for the HMD;
one or more inputs for camera data for the 3D display;
a neural network trained to perform prediction of frames for viewing by the user; and
a feedback loop to provide data regarding determined accuracy of predicted frames to the neural network;
wherein the system is to:
generate an estimate of motion of the HMD based at least in part on the motion data and the camera data,
perform an analysis of the motion estimation utilizing the neural network,
generate, by the neural network, one or more predicted frames as a next frame for viewing by the user based at least in part on the neural network analysis of the motion estimation, and
determine the next frame for viewing by the user and display the determined next frame for viewing by the user in the 3D display, including the system to:
determine whether the one or more predicted frames include an accurate prediction of the next frame for viewing, and
upon determining that the one or more predicted frames include an accurate prediction of the next frame for viewing, select a next frame that is accurately predicted from the one or more predicted frames for display; and
wherein the generation by the neural network of the one or more predicted frames for the next frame for viewing by the user includes the neural network to apply the data regarding determined accuracy to improve future accuracy of predictions by the neural network of next frames for viewing.

15. The system of claim 14, wherein the generation by the neural network of the one or more predicted frames as the next frame for viewing by the user further includes generation of a range of frames for selection by the system, and wherein the system is to select the next frame for viewing by the user from the range of frames upon determining that the range of frames include an accurate prediction of the next frame for viewing.

16. The system of claim 14, wherein the generation by the neural network of the one or more predicted frames as the next frame for viewing by the user is further based on additional data indicative of the user's intent regarding image viewing.

17. The system of claim 16, further comprising an eye tracker to track at least one eye of the user, and wherein the additional data indicative of the user's intent includes data generated by the eye tracker.

* * * * *